United States Patent [19]

Patton

[11] Patent Number: 4,461,063
[45] Date of Patent: Jul. 24, 1984

[54] PREVAILING TORQUE ADJUSTING ELEMENT AND METHOD AND APPARATUS FOR THE CONSTRUCTION THEREOF

[75] Inventor: DeLane D. Patton, Worthington, Ohio

[73] Assignee: Columbus Auto Parts Company, Columbus, Ohio

[21] Appl. No.: 296,260

[22] Filed: Aug. 26, 1981

[51] Int. Cl.³ .............................................. B23P 13/00
[52] U.S. Cl. .................................... 29/175 R; 72/416; 403/44
[58] Field of Search ........................ 403/44, 45, 46, 47, 403/48, 274; 29/175 R, 517, 518; 72/416, 472, 470

[56] References Cited

U.S. PATENT DOCUMENTS

| | | |
|---|---|---|
| 373,871 | 11/1887 | Williams . |
| 1,919,347 | 7/1933 | Sunderland .......................... 403/274 |
| 2,355,253 | 8/1944 | Whitfield . |
| 2,596,885 | 5/1952 | Booth . |
| 3,065,983 | 11/1962 | Flumerfelt . |
| 3,216,091 | 11/1965 | Floyd, Jr. .......................... 72/416 X |
| 3,229,999 | 1/1966 | Storch . |
| 3,320,659 | 5/1967 | Jerome . |
| 3,496,800 | 2/1970 | Brezinski . |
| 3,501,828 | 3/1970 | Schultz . |
| 3,551,999 | 1/1971 | Gutmann . |
| 3,583,052 | 6/1971 | Herbenar . |
| 3,801,207 | 4/1974 | Herbenar . |
| 3,889,511 | 6/1975 | Bayle . |
| 4,093,388 | 6/1978 | MacArthur . |
| 4,111,568 | 9/1978 | Wing . |

*Primary Examiner*—Andrew V. Kundrat
*Attorney, Agent, or Firm*—Harness, Dickey & Pierce

[57] ABSTRACT

A prevailing torque adjusting element, which in the described embodiment is in the form of a sleeve, for connecting motor vehicle tie rod or other turnbuckle assemblies, having a plurality of linearly extending substantially parallel deformations spaced apart around the sleeve, extending substantially the entire length of the sleeve, except for the ends, which deformations hold at least one rod member threadably in said sleeve in a positive, yet adjustable, fashion. Also disclosed is an apparatus and method for forming a threaded sleeve member into a prevailing torque adjusting element of the present invention comprising upper and lower dies, each having notches, wherein said sleeve may be placed between said dies in a predetermined manner to form a sleeve member or the like into a prevailing torque adjusting element of the present invention.

11 Claims, 5 Drawing Figures

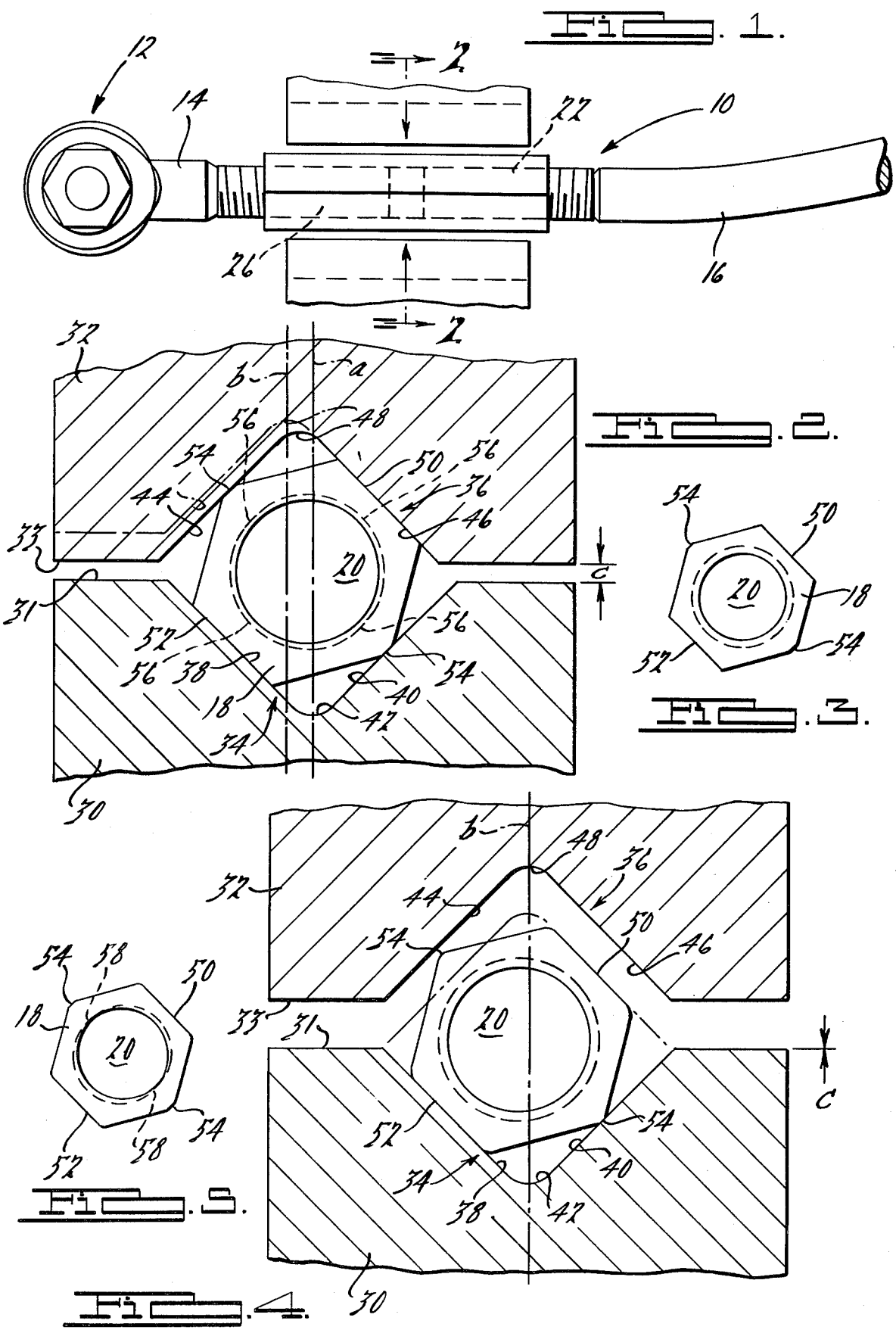

PREVAILING TORQUE ADJUSTING ELEMENT AND METHOD AND APPARATUS FOR THE CONSTRUCTION THEREOF

BACKGROUND AND SUMMARY OF THE INVENTION

The present invention relates generally to turnbuckle assemblies for connecting tie rods and the like in motor vehicles, and in particular to a new and improved prevailing torque adjusting sleeve for such a turnbuckle.

Hexagonal turnbuckle sleeves having prevailing torque deformations in the turnbuckle sleeve caused by opposing dies deforming the turnbuckle sleeve is conventionally known in the art of vehicle steering controls. In the present invention, the stems of two tie rod ends are threaded into a turnbuckle sleeve in a conventional manner. The sleeve is cylindrical in shape, and may also have a hexagonal outer surface for facilitating adjustment with a wrench. After the stems are inserted to the desired depth, the turnbuckle sleeve is positioned between two opposed crimping dies. These dies are formed with a "V" notch portion on one face of each die, which notches oppose one another when the dies are operably disposed. Pressure is then applied, forcing the dies together, thereby deforming the turnbuckle sleeve into the threaded stems of the tie rods. Due to the shape of the dies, the turnbuckle sleeve will be deformed at equally spaced positions around the body of the sleeve and deformed throughout its entire length except at the ends. It is important that the turnbuckle sleeve is deformed only to the extent that a controlled turning torque results from the crimping pressure. This is the torque considered sufficient to maintain tightness under operating loads and vibration while permitting subsequent adjustment for the standard wrench. It should also be noted that in the case of a cylindrical outside surface for the turnbuckle, the deformation will provide for the necessary flat surfaces for subsequent adjustment with a standard wrench.

It is one object of the present invention to hold the threaded parts together in a positive yet adjustable fashion and with light deformations over the entire area of the sleeve such that the deformations are spread out instead of being concentrated. Concentrated deformations pose the problem that whenever the turnbuckle parts are relatively rotated, the concentrated deformed parts cause thread wear and hence limit the amount of adjustment that can be made over an extended period of time. By having the deformations spread out or distributed evenly, a significantly greater amount of adjustment can be accomplished a number of times without wearing out the threads.

The present invention also has an object to achieve substantially either two or four separately circumferentially spaced deformations in the sleeve. The four deformation contacts are preferable in order to create four lines of contact and provide a substantially circular cross-section for the threads on the interior of the sleeve. An oval shaped cross-section, with two contact lines of deformation, however, is also within the scope of the present invention.

It is a further object of the present invention to limit the amount of prevailing torque for adjustment of the sleeve to a controlled turning torque. In a typical automotive application, this prevailing torque is a total of 20 to 30 foot-pounds or 10 to 15 foot-pounds of torque at each end of the sleeve. In the present invention, the prevailing torque is controlled by the spacing between the deforming dies caused by the amount of space between the dies at which the machine stop is preprogrammed or otherwise set. By varying the spacing (changing the stop point), the total amount of prevailing torque may be limited as desired.

Another object of the present invention is to deform the sleeve over the major length of the sleeve. This deformation provides the advantages that no wiggle of the two tie rod ends will occur (i.e., they will be held solidly) and negligible change will occur in the prevailing torque feature after a number of readjustments (prior art sleeves have a localized interference fit area that wears away rapidly). Also, a short distance at each end is not deformed so that any subsequent replacement tie rod end may be easily started into the threads.

Other objects and advantages of the instant invention will be apparent in the following specifiation, claims and drawings.

BRIEF DESCRIPTION OF THE DRAWINGS

FIG. 1 is an elevated front view of a tie rod assembly between the dies of the assembly in the present invention;

FIG. 2 is a vertical sectional view along the lines 2—2 of FIG. 1 illustrating one method of providing a prevailing torque adjustment sleeve of the present invention;

FIG. 3 is a vertical sectional view of the turnbuckle assembly of FIG. 2 subsequent to deformation;

FIG. 4 is a vertical sectional view similar to FIG. 2 illustrating a second method of providing a prevailing torque adjustment sleeve of the present invention; and FIG. 5 is a vertical sectional view of the turnbuckle assembly of FIG. 4 subsequent to deformation.

DETAILED DESCRIPTION OF THE PREFERRED EMBODIMENTS

Referring to FIG. 1, a turnbuckle assembly 10 is illustrated for connection of a tie rod assembly in an automotive vehicle. The assembly 10 comprises two elongated members, one a universal joint member 12 having an arm 14 extended therefrom, and the other a tie rod member 16, and a sleeve 18. The arm 14 of the joint member 12 and the tie rod member 16 each have a threaded end 20 and 22, respectively.

The sleeve 18 comprises a tube extruded over a mandril to give the sleeve 18 a controlled inside diameter for threading without requiring a reaming operation. The sleeve 18 is then internally threaded subsequent to extrusion. The outer surface of the sleeve 18 may be a true cylindrical surface, may be, as shown, a series of flats 26 forming a hexagon in cross-section, or may be a combination of the two surfaces. The hexagonal flats 26 as illustrated are a standard wrench size.

The ends 20 and 22 of the arm 14 and tie rod member 16, respectively, are threadably inserted into the sleeve 18 into a desired position prior to any deformation of the sleeve 18. This assembly step enables the sleeve threads to be in solid contact with the threads on the ends 20 and 22 of the arm 14 and tie rod member 16, respectively, and eliminates what would be a more difficult assembly operation against the prevailing torque feature subsequent to deformation. A lubricant and/or rust preventative may be applied to the ends 20 and 22 before threadable insertion into the sleeve 18 to both facilitate assembly and protect the exposed threads from corrosion.

Referring to FIGS. 1 and 2, once the threaded assembly has been performed, the turnbuckle assembly 10 is positioned between a first lower die 30 and a second upper die 32 within a press (not shown). In FIG. 2, lower die 30 is stationary, and upper die 32 moves from the dashed lines position to the position shown. Both the lower die 30 and the upper die 32 are block dies having faces 31 and 33, respectively, opposing one another when the dies 30 and 32 are disposed in their operating position. Each face has a V-shaped notch, with the V-shaped notch 34 on die 30 and notch 36 on die 32 extending the width of the respective dies. The sides 38 and 40 of notch 34 form a right angle and have a rounded apex 42. The sides 38 and 40 each form an angle of 45 degrees with the centerline a of the lower die 30. Centerline a is perpendicular to face 31 of die 30 and is directed towards die 32. Similarly, the sides 44 and 46 of notch 36 form a right angle, have a rounded apex 48, and each form an angle of 45 degrees with the centerline b of the upper die 32. Centerline b is perpendicular to face 33 of die 32 and is directed towards die 30. Each of the apexes 42 and 48 form a longitudinal axis for the notches 34 and 36, respectively, which respective longitudinal axes are perpendicular to and intersect either centerline a or centerline b, respectively.

The preferred method of operation is illustrated in FIG. 3. The centerlines a and b of notches 34 and 36 are parallel and spaced apart to apply contact forces to the flat surfaces 50 and 52 of the sleeve 18, via surface 46 of upper die 32 and surface 38 of lower die 30, at the same time the apexes or corners 54 and 56 of the sleeve 18 come into contact with surface 44 of upper die 32 and surface 40 of lower die 30, respectively. The dies 30 and 32 are limited in their movement toward one another to a distance c by a stop or other means (not shown) on the press to control the amount of deformation of the sleeve 18 in order to give a desired prevailing adjustment torque. In this embodiment, for a typical automotive application, the desired prevailing adjustment torque is 10 to 15 foot-pounds at each end 20 and 22, or 20 to 30 foot-pounds of total prevailing adjustment torque for the sleeve 18. Such a desired prevailing adjustment torque is obtained with a stop distance ("c") equal to 0.94 inch for 11/16-18 UNS-2B threads and a 0.870/0.876 inch dimension across the flats 50, 52. The dies 30 and 32 push the sleeve threads into contact around the circumference of the threaded ends 20 and 22 to provide four substantially uniform deformations around the sleeve 18, but with a slightly greater amount of contact across the corners 54 of the sleeve 18. As illustrated in FIG. 2, however, the sleeve 18 still retains a substantially circular interior thread cross-section although the deformation 56 are spaced all around the circumference of the interior of the sleeve. Each deformation 56 is also linear along the entire length of the sleeve 18 (except for the ends) since the dies 30 and 32 extend almost the full length of the sleeve 18 (FIG. 1). When concentrated deformations are utilized, as in the prior art, whenever the parts are relatively rotated, the concentratedly deformed part will cause thread wear and limit the amount of adjustment that can be made over an extended period of time. The linear defomations provided by the present invention, along with having the deformations spaced evenly circumferentially around the interior of the sleeve 18 permits a significantly greater number of adjustments and readjustments to be made without wearing out the threads, while also holding the parts together in a positive fashion.

Alternatively, the centerlines a and b of the dies 30 and 32 may be aligned, as shown in FIG. 4. The resultant sleeve cross-section (FIG. 5) is more of an elliptical or oval configuration, including primarily linear deformations 58 at the apexes 54 of the sleeve 18 running substantially the length of the sleeve 18 (except at the ends), and no deformation across the flats 50 and 52 of the sleeve 18. Again the dies 30 and 32 may be limited in the amount of deformation at the opposed apexes 54 by a distance c due to the stop setting used on the press to stop the dies 30 and 32 to provide the desired prevailing adjustment torque. As shown in FIG. 4, however, the distance "c" may be negligible or even zero in a desired setting, as indicated by the dashed lines representing upper die 32. With the aligned centerlines a and b, the threads are pushed into tight contact on opposite sides of the sleeve 18, but only substantially along those two lines of contact, to hold the parts together in a positive manner.

The linear deformations 56 (FIG. 2) or 58 (FIG. 5) provide a contact between the parts to hold the parts solidly and positively without any "wiggle" within the turnbuckle assembly between parts. Referring to FIG. 1, as stated above, a short distance at each end of the sleeve is not deformed so that any subsequent replacement parts may be easily started into the threads.

It must also be noted that although the present embodiments herein described only involve a sleeve wherein members are threaded into both ends of the sleeve, the present invention is equally applicable to applications wherein only one member is matingly threaded into one end of an axially extending, threaded receptacle.

Illustrative embodiments of the instant invention which fully and effectively accomplish the objects thereof are herein disclosed in the variations in the details of the apparatus may be indulged in without departing from the sphere of the invention herein described, or the scope of the appended claims.

What is claimed is:

1. An apparatus for positively holding a turnbuckle assembly together, said turnbuckle comprising a sleeve having a polygonally shaped outer cross-section comprised of a plurality of outer surfaces with edges therebetween and two elongated members threaded into said sleeve, said apparatus comprising a first die and a second die, each said die having a face directed to said other die and having a V-shaped notch extending across said face to form a pair of angularly disposed surfaces, the apex of each said V-notch forming a longitudinal axis, said notch on said first die extending parallel to said notch on said second die, each said die having an axis normal to said face and intersecting said longitudinal notch axis and directed to the other of said dies, said apparatus including means capable of spacing apart at least one pair of said axes of said dies prior to an operation on said assembly wherein said sleeve can be placed between said dies with one surface of said sleeve set against one of the face surfaces of said first die and a second surface of said sleeve set against one of the face surfaces of said second die and said sleeve can be deformed to provide linear longitudinally extending deformations spaced circumferentially around the body of said sleeve to positively hold said turnbuckle assembly together in an adjustable fashion wherein said face surfaces on each die form an angle with one another wherein when one of said pair of surfaces contacts one of the surfaces of said sleeve, the other of said pair surfaces only contacts said sleeve at one of said edges.

2. An apparatus in accordance with claim 1, wherein said sleeve has a threaded portion having a substantially circular cross-section.

3. An apparatus in accordance with claim 2, wherein said threaded portion of said sleeve at said deformations has a substantially oval cross-section.

4. An apparatus in accordance with claim 1, wherein said deformations do not extend to either end of said sleeve.

5. An apparatus in accordance with claim 1, wherein the axes of said dies directed toward one another are aligned when said apparatus is disposed in its operative position.

6. An apparatus in accordance with claim 1, said apparatus further comprising a positive stop providing a space between said first and second dies determining the amounted of prevailing torque necessary for adjustment of said turnbuckle assembly.

7. An apparatus for positively holding a turnbuckle assembly together, said turnbuckle comprising a sleeve and two elongated members threaded into said sleeve, said apparatus comprising a first die and a second die, each said die having a face directed to said other die and having a V-shaped notch extending across said face, the apex of each said V-notch forming a longitudinal axis, said notch on said first die extending parallel to said notch on said second die, each said die having an axis normal to said face and intersecting said longitudinal notch axis and directed to the other of said dies, wherein said sleeve can be placed between said dies and deformed to provide linearly extending deformations spaced circumferentially around the body of said sleeve to positively hold said turnbuckle assembly together in an adjustable fashion the axes of said first and second dies directed toward one another being parallel and spaced apart when said apparatus is disposed in operative position.

8. A method for positively and adjustably holding a turnbuckle assembly together, said turnbuckle assembly comprising an internally threaded sleeve and two elongated members each having at least one threaded end threadably insertable into opposite ends of said sleeve, comprising:

placing a first and a second die in a press, said dies each having a face, each said face having a V-notch extending across said face, the apex of each said V-notch forming a first longitudinal axis for each said notch, each said die having a second axis normal to said face and intersecting said longitudinal notch axis;

positioning said dies wherein said faces are directed toward one another, said first longitudinal axes of said notches are parallel to one another, and each said second normal axis of each said die is directed toward the other of said dies;

positioning said sleeve of said assembled turnbuckle between said notches of said dies; and pressing said dies together onto said sleeve to deform said sleeve.

9. A method in accordance with claim 8, further comprising the step of aligning the second normal axes of said dies prior to positioning said sleeve to be pressed.

10. A method in accordance with claim 8, further comprising the step of disposing the second normal axes of said dies in a parallel spaced apart position prior to positioning said sleeve to be pressed.

11. A method in accordance with claim 8, further comprising the step of determining a stop distance that would result in deforming said turnbuckle assembly to a desired prevailing adjustment torque and setting the press to stop said dies prior to pressing said dies together, wherein said dies will stop when said selected stop distance has been reached between said dies.

* * * * *

UNITED STATES PATENT AND TRADEMARK OFFICE
CERTIFICATE OF CORRECTION

PATENT NO. : 4,461,063
DATED : July 24, 1984
INVENTOR(S) : De Lane D. Patton

It is certified that error appears in the above-identified patent and that said Letters Patent is hereby corrected as shown below:

Column 2, line 19, delete "specifiation" and insert
--specification--.
Column 6, line 1, insert "its" after --in--.

Signed and Sealed this

*Fifteenth* Day of *October 1985*

[SEAL]

*Attest:*

*Attesting Officer*

DONALD J. QUIGG

*Commissioner of Patents and Trademarks—Designate*